United States Patent
Smith et al.

(10) Patent No.: US 6,902,684 B1
(45) Date of Patent: Jun. 7, 2005

(54) NON-AQUEOUS ELECTROLYTES FOR ELECTRICAL STORAGE DEVICES

(75) Inventors: W. Novis Smith, Philadelphia, PA (US); Joel McCloskey, Philadelphia, PA (US)

(73) Assignee: Lithdyne International, Anaheim, CA (US)

( * ) Notice: Subject to any disclaimer, the term of this patent is extended or adjusted under 35 U.S.C. 154(b) by 134 days.

(21) Appl. No.: 10/244,937

(22) Filed: Sep. 16, 2002

(51) Int. Cl.$^7$ ................................................ H01G 9/035
(52) U.S. Cl. ..................... 252/62.2; 361/503; 361/504; 361/505; 429/339
(58) Field of Search ........................ 252/62.2; 361/503, 361/504, 505; 429/339

(56) References Cited

U.S. PATENT DOCUMENTS 5,418,682 A * 5/1995 Warren et al. .............. 361/502

OTHER PUBLICATIONS

CAS Reg citation for RN 228724-37-6.*

* cited by examiner

Primary Examiner—C. Melissa Koslow
(74) Attorney, Agent, or Firm—John Lezdey

(57) ABSTRACT

A non-aqueous electrolyte for electric storage devices consisting of a nitrile solvent and a complex salt formed by the reaction of a tetraalkyl ammonium salt and hydrogen fluoride. The electrolyte may include a component which a cation of an imidazolium or quaternary tetraalkylammonium salt.

11 Claims, No Drawings

NON-AQUEOUS ELECTROLYTES FOR ELECTRICAL STORAGE DEVICES

FIELD OF THE INVENTION

The present invention relates to an improvement in non-aqueous electrolytes for electrical storage devices such as capacitors and batteries. More particularly there is provided a new crystalline salt complex of hydrogen fluoride and a tetraalkylammonium cation in a nitrile solvent. The electrolyte may include a quaternary tetraalkylammonium salt and an imidazolium salt.

BACKGROUND OF THE INVENTION

Significant effort has been invested over the years in improving the energy and power of electrical energy storage devices such as capacitors and batteries. These are particularly useful in short term, high energy applications such as electric vehicles or cellular communication. Warren et al., U.S. Pat. No. 5,418,682, discloses a capacitor having an electrolyte consisting of tetraalkylammonium salts which include nitrile or dinitrile solvents and teaches that such a system provides a high dielectric constant, which is needed for capacitance. Morimoto et al., U.S. Pat. No. 4,725,926, discloses a non-aqueous electrolyte comprising quaternary phosphonium salts in organic solvents for use in electric double layer capacitors.

A wide variety of solvents and salts are available for such use, offering specific advantages depending on the application being considered (e.g., low temperature vs. high temperature). Ionic liquids based on the imidazolium cation have recently received attention as non-aqueous electrolytes in various electrochemical devices (Koch et al., J. Electrochem. Soc. 143:155, 1996). These electrolytes have significant advantages compared to the numerous quaternary onium salts that have been previously investigated for use in carbon double-layer capacitor electrolytes (Ue et-al., J. Electrochem. Soc. 141:2989, 1994).

Electrochemical capacitors based on nonaqueous electrolytes offer greater electrochemical stability (up to 4 V) compared to aqueous systems, thereby providing greater energy storage (E=½CV2). However, due to the lower conductivity of nonaqueous electrolytes compared to aqueous systems, lower power capabilities are observed. In addition, with the porous materials used in electrochemical capacitors, the high viscosity typically associated with the high dielectric constant solvents used in non-aqueous electrolytes is detrimental to conductivity in porous electrodes.

There is an ongoing need for stable more conductive solutions of ionic salts for electronic devices such as batteries and double layer capacitors. In the case of lithium ion batteries, it is the lithium salts that are required such as lithium hexafluorophosphate is a suitable stable solvent such as an organic carbonate mix. In the case of the double layer capacitor it is usually an organic solvent solution of a quaternary ammonium salt such as tetrafluoroborate in acetonitrile or organic carbonates. These battery and double layer capacitor salts are usually used in the ranges of about 0.6 to 2.0 molar depending on their solubility and where the maximum conductivity falls. Usually in the case of double layer capacitor electrolytes, the solutions have conductivities of up to about 55 mS-cm at about 1 molar in acetonitrile using tetraethylanmonium tetrafluoroborate.

SUMMARY OF THE INVENTION

The present invention provides a non-aqueous electrolyte for electric storage devices comprising tetraalkylammonium F(HF)$_x$ salts and a nitrile solvent, wherein the alkyl groups are of 1–4 carbon atoms.

There may also be included the salt of a cation selected from the group consisting of 1) an imidazolium compound of the formula:

1. A non-aqueous electrolyte for electric storage devices which comprises a nitrile solvent and a conductive salt selected from the group consisting of
   (a) an imidazolium compound of the formula:

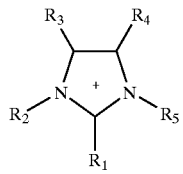

Wherein $R_1$, $R_2$, $R_3$, $R_4$, and $R_5$ are the same or different and are selected from the group consisting of hydrogen, an alkyl of 1–4 carbon atoms, or fluoroalkyl, with the proviso that at least one of $R_1$, $R_2$, $R_3$, $R_4$, and $R_5$ being hydrogen.

(b) an ammonium compound of the formula:

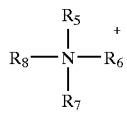

wherein $R_5$, $R_6$, $R_7$, and $R_8$, are the same or different and consists of alkyl of 1–4 carbon atoms, or fluoroalkyl, and (c) a tetraalkylammonium compound of the formula:

$R_5R_6R_7R_8R_9N+$ wherein $R_5$, $R_6$, $R_7$, $R_8$, and $R_9$ are the same or different and consists of alkyl of 1–4 carbon atoms, said salt being present in a molar concentration of at least 0.4, and an anion selected from the group consisting of tetrafluoroborate ($BF_4^-$) hexafluoroarsenate ($AsF_6$), hexafluorophosphate ($PF_6^-$), and fluoro hydrogen fluoride F(HF)$_x$.

Advantageously, the solutions of the tetraalyl ammonium compound F(HF)$_x$ salts are at a 0.4 to 3.0 molar range.

OBJECTS OF THE INVENTION

There is a general object of the invention to provide a non-aqueous electrolyte having high conductivity that is stable and can be used in electric storage devices.

It is another object of the invention to provide a non-aqueous liquid electrolyte to provide optimum capacitance, high power density, high energy density and long lifetime without memory effects when used with a nitrile solvent.

It is yet another object of the invention to provide a novel crystalline quaternary ammonium F(HF)$_x$ salt which can be used in non-aqueous electrolytes which readily dissolves in a nitrite solvent and imparts high conductivity.

DESCRIPTION OF THE PREFERRED EMBODIMENTS

According to the present invention, there is provided a non-aqueous electrolyte for electric storage devises, particularly, double layer capacitors. The electrolyte comprises tetraalkylammonium F(HF)$_x$ salt wherein the alkyl groups contain 1–4 carbon atoms and x is 1–4, and a nitrile solvent. The nitrile solvent can be a mononitrile or a dinitrile. The quaternary ammonium F(HF)$_x$ is at a concentration in about a 0.4 to 3.0 molar range.

There may also be included in the electrolyte the salt of a cation selected from the group consisting of a) an imidazolium compound of the formula:

More specifically, the non-aqueous electrolyte for electric storage devices comprises a nitrile solvent and a conductive salt selected from the group consisting of (a) an imidazolium compound of the formula:

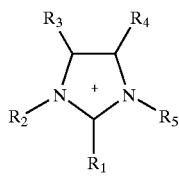

Wherein $R_1$, $R_2$, $R_3$, $R_4$, and $R_5$, are the same or different and are selected from the group consisting of hydrogen, an alkyl of 1–4 carbon atoms, and fluoroalkyl groups, with the proviso that at least one of $R_1$, $R_2$, $R_3$, $R_4$, and $R_5$ is hydrogen.

b) an ammonium compound of the formula:

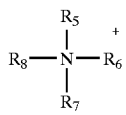

wherein $R_5$, $R_6$, $R_7$, and $R_8$ are the same or different and consist of alkyl of 1–4 carbon atoms, or fluoroalkyl groups, and (c) a tetraalkylammonium compound of the formula:

wherein $R_6R_7R_8R_9N+$ $R_6$, $R_7$, $R_8$, and $R_9$ are the same or different and consists of alkyl of 1–4 carbon atoms, said salt being present in a molar concentration of at least 0.4, and an anion selected from the group consisting of tetrafluoroborate ($BF_4^-$) hexafluoroarsenate ($AsF_6^-$), hexafluorophosphate ($PF_6^-$), and fluoro hydrogenfluoride (F(HF)x), wherein x is 1–4.

The ammonium F(HF)$_x$ salt can comprise the cation of formula I, II and/or a mixture thereof. The quaternary ammonium F(HF)$_x$ salts which may be used include tetraethylammonium F(HF)$_{2.33}$, tetramethyl ammonium F(HF)$_x$ salt, trimethylethylammonium F(HF)$_x$, trimethyl (n-butyl) ammonium F(HF)$_x$, and methyltrimethyl ammoniumn F(HF)$_x$.

Other salts which may he added are preferably where the cation is 1,3-dialkyl imidazolium, most preferably, 1-ethyl-3-methylimidazolium, 1-methyl-3-methylimidazolium, 1,2-dimethyl-3-propylimidazolium, trimethylethyl ethylammonium, timethyl, n-propylammonium and tetraethylammonium and the anion is tetrafluoroborate, hexafluoroarsenate, or hexafluorophosphate.

Among organic electrochemical solvents, nitriles such as acetonitrle, or "ACN" ($CH_3CN$), are especially useful because they are generally nonreactive and difficult to oxidize or reduce electrochemically and have a high dielectric constant. Acetonitrile has one of the widest available ranges of electric potential of any organic solvent (in excess of 4 V with a platinum electrode with the electrolyte salts of the invention).

Other nitrites that might be considered for electrochemistry (such as the phenylacetonitrile, iosbutyronitrile, benzonitrile, and propinitrile, for example) generally have even lower dielectric constants and lower ranges of electric potential stability compared with ACN. Dinitrile systems, such as succinonitrile, or "SN" ($NCCH_2CH_2CN$), and glutaronitrile, or "GN" ($NCCH_2CH_2CN$), have high boiling points (i.e., greater than about 265° C.), but are less well known. SN has a relatively high dielectric constant in the liquid state, but it is a solid at room temperature (m.p.= 54°–56° C.). GN however, is a liquid at room temperature (m.p.=29° C.).

Other solvents suitable for use as electrolytes in the present invention include dinitriles such as 2-methylglutaronitrile and mixtures of nitriles and dinitriles. Embodiments of the invention may include various mixtures of the described electrolytes to cover a wide range of operating temperatures from about –60V C. to about 150° C.

In the preferred embodiments of the present invention, the electrolyte solvents contain nitriles (including dinitriles, typically in miles such as 2:1 SN:GN (wt:wt), for example) that are liquid at room temperature and have relatively high dielectric constants The accessible electric potential range of such mixtures (i.e., before solvent breakdown) is about 4 V as measured by cyclic voltammetry on a platinum electrode, which is approximately equal to that of ACN. A cyclic voltammogram of a nitrogen-purged ACN electrolyte containing approximately 0.1 M $Et_4NBF_4$ with a platinum electrode exhibited breakdown currents at approximately –2.5 V and +2.5 V relative to a reference electrode ($Ag^0$/0.1M $AgNO_3$ (ACN)). A corresponding system using 2:1 SN:GN (wt:wt) began breakdown at approximately –2.2 V and +2.2 V. Other solvents suitable for use as electrolytes in the present invention include dinitriles such as 2-methylglutaronitrile and 2-cyanoethyl ether and mixtures of nitrites and dinitriles. Embodiments of the invention may include various mixtures of the described electrolytes to cover a wide range of operating temperatures from about –60° C. to about 150° C.

The following tables illustrate the conductive of the electrolyte of the invention in a nitrile solvent.

TABLE 1

Conductivity of Electrolytes in Acetonitrile

|  | mS/cm at 25° C. |
|---|---|
| 1.0M TEAF · 2.3HF | 75.2 |
| 1.0M TEAF · 1.5HF | 67.0 |
| 1.5M EMIF · 2.3HF | 91.7 |
| 1.5M TEAF · 2.3HF | 90.8 |

TABLE 2

|  | mS/cm at 25° C. |
|---|---|
| 1.0M TEATFB | 52.0 |
| 1.0M MTEATFB | 50.3 |
| 1.0M EMITFB | 50.2 |
| 2.0M MTEATFB | 56.2 |

TABLE 3

Conductivity of Electrolyte in Succinonitrile/2-methylglutaronitrile 50/50

| | mS/cm at 25° C. |
|---|---|
| 1.5M TEA · 2.3FHF | 20.2 |

TEA—tetraethylammonium
EMI—1-ethyl-3-methylimidazolium
MTEATFB—methyltriethylammonium tetrafluoroborate
TEATFB—tetraethylammonium tetrafluoroborate

EXAMPLE 1

As an example of a process for preparing the tetraalkylammonium $F(HF)_x$ salts, the following procedure was used to prepare tetraethylammonium $F(HF)_{2.33}$.

At least 60 g (minimum of a four-fold excess of anhydrous HF) is added to 100 g of tetrethylammonium chloride under dry atmosphere in a PFA bottle or reactor. The mixture is heated and stirred up to 110° C. A vacuum is then applied to the liquid for two hours while stirring at this temperature. The fluid is allowed to cool under inert atmosphere and it crystallizes at about 60° C. The clear large colorless crystals are broken up and cooled. The material is free of chloride (silver nitrate test) and crystalline. The yield is quantitative. The crystals are stored in a moist-free container either of aluminum or PFA or polyethylene under nitrogen or argon.

The new crystalline salt tetraethylammonium $F(HF)_{2.33}$ as determined by titration readily dissolves in acetonitrile or other nitrites and dinitriles forms stable solutions even though it contains an excess of HF in the molecule. These solutions possess exceptionally high conductivities, are stable, and remain colorless. The conductivity of a 1 molar solution in acetonitrile is 75 mS-cm at 25° C. and 90 mS-cm at 1.5 molar. This represents the highest solution conductivity for an organic solution of such a salt and would be desirable for double layer capacitor application. This solution is stable because the excess HF is tied up as a complex anion [Hagiwara, H. et al., J. Electrochemical Soc., 149(1) D1 (2002)].

EXAMPLE 2

Preparation of [(Tetraethylammonium) (FHF)]3[HF]4 complex salt (HF/F=2.33 mole basis).

Added 330 g(2 ml) tetraethylammonium chloride slowly to 240 g(12 m) anhydrous HF protected from the atmosphere under argon with stirring with cooling in a Teflon bottle (PFA). The solution was maintained between 20–40° C. with an argon stream to remove the excess HF and the hydrogen chloride. (No chloride remained in the liquid as determined by testing with aqueous silver nitrate). Transferred in the liquid to a vacuum chamber and maintained it at 100° C. for 3 hours. Broke the vacuum with argon and cooled. The liquid solidified at about 50–60° C. Determined the HF content by titrating the acid level with sodium hydroxide solution. It was found to correspond exactly to theoretical. HF/F=2.33. Conductivity of the salt was 90.8 mS/cm at 25° C. and 1.5 M in acetonitrile.

EXAMPLE 3

Preparation of Tetraethlamonium $F(HF)_x$, (HF/F=1.50

The salt of example (1) was heated under vacuum to 150° C. and vacuum for four hours and then cooled and bottled under inert atmosphere. The titration showed that the HF/F ratio was now 1.50. The melting point of the solid was now about 100–110° C. The conductivity of this salt was 67.0 mS/cm at 1.0 M in acetonitrile at 25° C.

EXAMPLE 4

Preparation of 1-Ethyl-3-methylimidazolium (FHF)]
3[HF]4 Complex Salt 9HF/F=2.33)

Added 200 g anhydrous hydrofluoric acid to 70 g 1-Ethyl-3-methylimidazolium chloride in a PFA bottle under inert atmosphere with a magnetic stirring bar and some cooling (mildly exothermic). Heated the contents of the bottle with stirring up to 100° C. with a slow argon stream. (No acid gas was observed coming off above 50° C.) Placed the bottle in a vacuum chamber and heated at 110° C. for four under vacuum. Cooled and removed under inert atmosphere. (Titration showed HF/F ration to be almost exactly 2.33 on a mole basis.) Conductivity was 91.7 mS/cm at 25° C. at 1.5 M in acetonitrile.

While the present invention has been described in conjunction with a preferred embodiment, one of ordinary skill, after reading the foregoing specification, will be able to effect various changes, substitutions of equivalents, and other alterations to the compositions and methods set forth herein. It is therefore intended that the protection granted by Letters Patent hereon be limited only by the definitions contained in the appended claims and equivalents thereof.

What is claimed is:

1. A non-aqueous electrolyte for electric storage devices which comprises a nitrile solvent and a conductive salt comprising a cation selected from the group consisting of
    (a) an imidazolium compound of the formula:

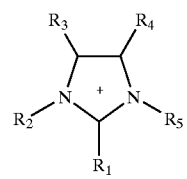

wherein $R_1$, $R_2$, $R_3$, $R_4$, and $R_5$ are the same or different and are selected from the group consisting of hydrogen, an alkyl of 1–4 carbon atoms, and fluoroalkyl, with the proviso that at least one of $R_1$, $R_2$, $R_3$, $R_4$ and $R_5$ is hydrogen,
    (b) an ammonium compound of the formula:

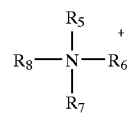

wherein $R_5$, $R_6$, $R_7$, and $R_8$, are the same or different and consists of alkyl of 1–4 carbon atoms, or fluoroalkyl, and
    (c) a tetraalkylammonium compound of the formula:

wherein $R_6$, $R_7$, $R_8$, and $R_9$ are the same or different and consists of alkyl of 1–4 carbon atoms and an anion which is fluoro hydrogen fluoride $(F(HF)x$ wherein x is 1–4), said salt being present in a molar concentration of 0.4 to 3.0.

2. The non-aqueous electrolyte of claim 1 wherein said salt is tetraalkylammonium $F(HF)_{1.5}$.

3. The non-aqueous electrolyte of claim 1 wherein said nitrile solvent is selected from the group consisting of a mononitrile and a dinitrile.

4. The non-aqueous electrolyte of claim 3 wherein said nitrile is selected from the group consisting of acetonitrile, proprionitrile, glutaronitrile, isobutyronitrile, succinonitrile, and methylglutaronitrile.

5. The non-aqueous electrolyte of claim 4 wherein said mononitrile is acetonitrile.

6. The non-aqueous electrolyte of claim 1 including a salt of a cation selected from the group consisting of an:

(a) imidazolium compound of the formula:

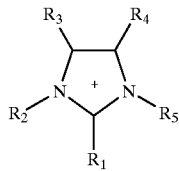

wherein $R_1$, $R_2$, $R_3$, $R_4$, and $R_5$ are the same or different and are selected from the group consisting of hydrogen, an alkyl of 1–4 carbon atoms, and fluoroalkyl, (b) an ammonium compound of the formula:

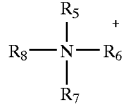

wherein $R_5$, $R_6$, $R_7$, and $R_8$, are the same or different and consists of alkyl of 1–4 carbon atoms, and (c) a tetraalkylammonium compound of the formula:

wherein $R_6$, $R_7$, $R_8$, and $R_9$ are the same or different and consists of an alkyl group of 1–4 carbon atoms, and an anion of the formula $F(HF)_x$ wherein x is 1–4.

7. The non-aqueous electrolyte of claim 6 wherein said imidazolium cation is selected from the group consisting of 1,3-dialkylimidazolium, and 1,2-dialkylimidazolium.

8. The non-aqueous electrolyte of claim 6 wherein said cation is 1-ethyl-3-methylimidazolium.

9. The non-aqueous electrolyte of claim 1 including a salt comprising of a cation which is 1,3-dialkyl imidazolium and the anion is selected from the group consisting of tetrafluoroborate, hexafluoroarsenate, and hexafluorophosphate.

10. The non-aqueous electrolyte of claim 9 wherein said 1,3-dialkyl imidazolium cation is 1-ethyl-3-methylimidazolium.

11. A non-aqueous electrolyte for electric storage devices comprising a mixture of tetraethylammonium tetrafluoroborate, 1-methyl-3-imidazolium tetrafluoroborate and tetraethylammonium $(F(HF)_{2.33}$ in acetonitrile in a molar concentration of 0.4 to 3.0.

* * * * *